United States Patent [19]

Honig

[11] Patent Number: 4,831,899
[45] Date of Patent: May 23, 1989

[54] HYDRAULIC CONTROL MEANS

[75] Inventor: Ernst-August Honig, Wolfsburg, Fed. Rep. of Germany

[73] Assignee: Volkswagen AG, Wolfsburg, Fed. Rep. of Germany

[21] Appl. No.: 121,609

[22] Filed: Nov. 17, 1987

[30] Foreign Application Priority Data

Nov. 18, 1986 [DE] Fed. Rep. of Germany ....... 3639445

[51] Int. Cl.$^4$ .............................................. B60K 41/06
[52] U.S. Cl. ...................................................... 74/867
[58] Field of Search .................................. 74/867, 868

[56] References Cited

U.S. PATENT DOCUMENTS

| 4,291,596 | 9/1981 | Sakakibara | 74/867 |
| 4,462,278 | 7/1984 | Murakami et al. | 74/867 X |
| 4,476,745 | 10/1984 | Moan | 74/868 X |
| 4,501,173 | 2/1985 | Honig | 74/867 |
| 4,570,511 | 2/1986 | Nishimura et al. | 74/867 |
| 4,729,265 | 3/1988 | Sugano | 74/868 |
| 4,765,202 | 8/1988 | Hayasaki | 74/868 |

FOREIGN PATENT DOCUMENTS

| 2153907 | 3/1973 | Fed. Rep. of Germany | 74/867 |
| 2502347 | 7/1976 | Fed. Rep. of Germany | . |
| 1655587 | 7/1977 | Fed. Rep. of Germany | 74/867 |

Primary Examiner—Dwight G. Diehl
Attorney, Agent, or Firm—Brumbaugh, Graves, Donohue & Raymond

[57] ABSTRACT

A hydraulic control system for controlling application of a pressure medium in a hydraulically actuable shift member intended for an automatic automotive transmission, the control system including a throttle disposed in a pressure application line leading to the shift member, and a control valve controlling an unthrottled communication between a pressure medium supply line and the shift member, bypassing the throttle, as a function of the application pressure prevailing ahead of the shift member, in such manner that the communication is opened at the beginning of the application of pressure to the shift member and interrupted when a preassigned application pressure is reached. In addition, a device is provided for at least temporary maintenance of an engagement pressure lying below the full application pressure and remaining substantially at a constant level the control valve is to be configured to operate this device only upon interruption of the unthrottled communication between the pressure medium supply line and the shift member to ensure that the device for maintaining the engagement pressure will not become operative too early.

8 Claims, 2 Drawing Sheets

HYDRAULIC CONTROL MEANS

BACKGROUND OF THE INVENTION

The invention relates to a hydraulic control means for controlling the application of a pressure medium to a hydraulically actuable shift member intended for an automatic automotive transmission, having a throttle in the pressure application line leading to the shift member and a control valve controlling an unthrottled connection bypassing the throttle between a pressure medium supply line and the shift member as a function of the application pressure prevailing ahead of the shift member in such manner that upon commencement of the application of pressure to the shift member, the connection is opened, and interrupted when a preassigned application pressure is reached, and having a device for at least temporary maintenance of an engagement pressure lying below the full application pressure and remaining at a substantially constant level.

Such a control means is known for example from GLD Pat. No. 2,502,347. In that known control means, the device provided for maintaining a substantially constant engagement pressure, below the full application pressure, is a conventional accumulator whose spring-loaded piston is subjected to the application pressure acting on the shift member by way of a branch of the pressure application line, which branches off immediately ahead of the shift member. This accumulator is to ensure that during the engagement process, at least for a certain period, during which the piston of the accumulator is forced back against spring action, an approximately constant engagement pressure is maintained which is below the full application pressure delivered by the source of the pressure medium.

Other known control means, instead of a spring-loaded accumulator, may comprise embodiments in which the accumulator piston is acted upon against the pressure of the application pressure line on one or more countersurfaces by counterpressures capable of being added as required.

In all of these previously known embodiments, however, the accumulator has always been connected directly in parallel with the shift member, so that its piston would already be set in motion when, at the beginning of the shift operation, direct unthrottled supply of pressure medium was at first meant to overcome only the slack of the shift member or its actuating means. The pressure control effect of the accumulator, on the other hand, is required only for the actual operation of applying the shift member. A premature start of the accumulator piston therefore unnecessarily reduces the adjustment travel afterwards required.

SUMMARY OF THE INVENTION

Accordingly, it is an object of the present invention to provide hydraulic control means of the above type wherein the device for maintaining the engagement pressure, lying below the full application pressure, does not become operative until it is actually required, during the operation of applying the shift member itself.

Pursuant to this object, and others which will become apparent hereafter, one aspect of the present invention resides in the control valve being configured to connect the device for engagement pressure maintenance only when the unthrottled supply of pressure medium to the shift member has been interrupted and pressure medium is therefore supplied only by way of the throttle achieves the result that the limitation of the engagement pressure is actually operative only during the actual process of engagement of the shift member, after its slack has been overcome.

In a further embodiment of the invention a throttle leads to the atmosphere instead of the accumulator. It should here be noted in particular that the arrangement of a throttle leading to the atmosphere instead of the accumulator affords important structural advantages, since the arrangement of a rather bulky conventional accumulator fior the shift member can now be dispensed with. If additionally a second throttle is provided for communication with a pressure application line of a second shift member, the further possibility is provided of adjusting the engagement pressure to various levels depending ion the transmission.

The drawing schematically shows embodiments of the invention by way of example.

DETAILED DESCRIPTION OF THE PREFERRED EMBODIMENTS

Figure 1:
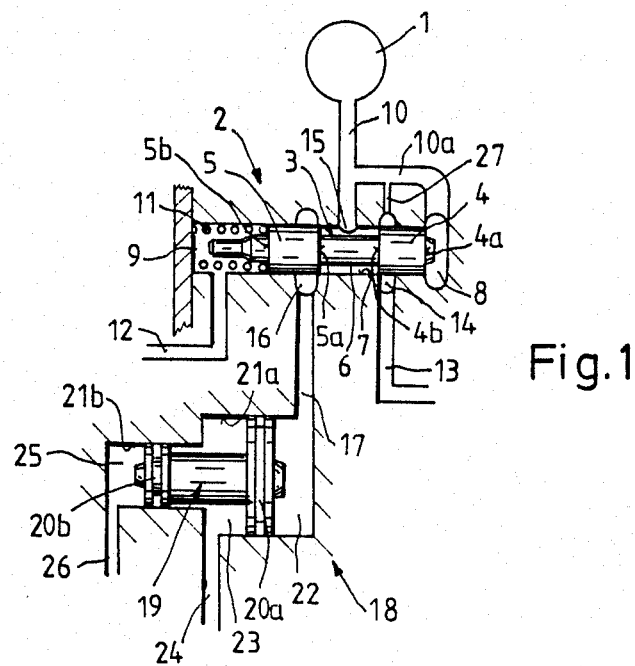
FIG. 1 shows a schematic diagram of a first embodiment of the hydraulic control means according to the invention.

In the drawing, like or comparable parts have been assigned like reference numerals. 1 represents a shift member of an automatic automotive transmission, comprising for example a hydraulically actuable disk brake interposed in the second and fourth forward train of an automatic four-speed transmission.

2 designates a control valve controlling the application of pressure to the shift member 1. This control valve has a control piston, generally designated by 3, with two control shoulders 4 and 5 as well as a shank 6 provided between the shoulders. The piston 3 is displaceably held in a cylindrical bore 7 of a housing. On its face to the right in the drawing, the piston 3 has an active surface 4a subjected to a pressure medium pressure prevailing in a pressure application chamber 8. On the left face in the drawing, an active surface 5b is provided, acted upon by a compression spring 11 as well as by a pressure prevailing in a pressure application chamber 9. Whereas the pressure application chamber 8 on the right face of the piston 3 communicates by way of a branch line 10a with a pressure application chamber 10 leading to the shift member 1, and so is acted upon at all times by the pressure applied to the shift member 1, to the pressure application chamber 9 on the left in the drawing a pressure line 12 is connected, in which a controllable pressure head prevails. This controllable pressure in the pressure line 12 may for example be delivered by an electromagnetic control valve and be so fixed that at the beginning of the shift operation of the member 1, it matches the atmospheric pressure, or alternatively the so-called throttle pressure, meaning a pressure variable as a function of load that is conventionally present in the transmission circuit. After elapse of a certain time since the connection of the shift member 1, the pressure in the pressure line 12 may then have been raised to the full main pressure of the transmission.

13 indicates a pressure medium supply line coming from a slide valve, not here shown, and acted upon by the main pressure in those speeds in which the member 1 is supposed to be in. The pressure medium supply line 13 leads to a pressure medium connection 14 whose communication with a pressure medium connection 15 communicating with the pressure application line 10 is controlled by the control edge 4b on the left in the drawing of the shoulder 4 of piston 3. In addition, the pressure medium connection 14 communicates at all times by way of a throttle 27 with the pressure application line 10, or in this case with its branch line 10a. A third pressure medium connection is designated 16 in the drawing; its communication with the pressure medium connection 15 leading to the pressure application line 10 of shift member 1 is controlled by the edge 5a on the right in the drawing of the shoulder 5. The manner of this control is that the pressure medium connection 16 remains closed by the shoulder 5 so long as the pressure medium connection 14 is opened by the edge 4b, and that the pressure medium connection 16 is opened by the edge 5a of shoulder 5 on the right in the drawing as soon as the pressure medium connection 14 is closed by the shoulder 4.

Now in the embodiment of FIG. 1, the pressure medium connection 16 communicates by way of a pressure medium line 17 with an accumulator generally designated 18, consisting of an accumulator piston 19 having two shoulders 20a and 20b. The two shoulders 20a and 20b are of different diameters and are axially displaceable in correspondingly stepped cylinder bores 21a and 21b. The face at the right in the drawing of the larger shoulder 20a is associated with a pressure application chamber 22 communicating by way of the pressure medium line 17 with the pressure medium connection 16, and so supplied, in appropriate setting of piston 3 of valve 2, with the application pressure prevailing in the pressure application line 10 iof shift member 1. A pressure application chamber designated 23 in FIG. 1 and associated with an annular active surface of shoulder 20a located to the left in the drawing may be subjected by way of a pressure medium supply line 24 with a pressure medium pressure of suitable level, for example the main pressure. Finally, a pressure application chamber 25 is provided, associated with the active surface of shoulder 20b to the left in the drawing and likewise capable of being subjected to a suitable pressure, which if desired, much like the pressure in line 24, may be variable according to the transmission speed.

The function of the hydraulic control means shown in FIG. 1 of the drawing is now such that at the beginning of the operation of putting in the shift member 1, the piston 3 of the control valve 2 stands in an extreme position displaced to the right from the neutral position shown in the drawing, in which extreme position the shoulder 4 is in contact with the housing. In this position, the pressure medium connection 14 communicates by way of the shank 6 of the piston 3 with the pressure medium connection 15 of the pressure application line 10, so that the pressure medium supply line 13 can deliver pressure medium to the shift member 1 directly and unthrottled. When as a result of this application of pressure the actuating elements of the shift member 1 have taken up their slack and are commencing the actual process of engagement, the pressure in the pressure application line 10 rises sharply, so that this pressure, returned to the pressure application chamber 8 of control valve 2, is able to displace the piston 3 to the left in the drawing, against the action of the spring 11 and any pressure that may prevail in the pressure application chamber 9. Here the shoulder 4 of piston 3 interrupts the communication between pressure medium connections 14 and 15, so that the pressure medium supply line 13 presently communicates with the pressure application line 10 only by way of the throttle 27, which remains connected at all times, and the further supply of pressure medium to the shift member 1 is consequently throttled. Simultaneously with the closing of the pressure medium connection 14 by the shoulder 4, however, the pressure medium connection 16 is opened by edge 5a of shoulder 5, so that the application pressure of shift member 1 prevailing in the pressure application line 10 is passed by way of pressure line 17 into the pressure application chamber 22 of the accumulator 18 as well, where it tends to displace the accumulator piston 19 to the left against the action of the pressure medium pressure acting on the other active surfaces. During the displacement of the accumulator piston 19, a substantially constant engagement pressure is maintained, which is adjusted by suitable dimensioning of the active surfaces of the accumulator piston 19 and the pressures acting upon it to such a value as to lie below the full main pressure of the transmission but sufficient to take up the torques to be transmitted by the shift member at the several transmission speeds. When the accumulator piston 19 strikes the left end of the housing, the limitation of the engagement pressure is terminated, and the application pressure in the pressure application line 10 rises rapidly to the full main pressure delivered by the pressure medium supply line 13.

By switching the pressure prevailing in the pressure application line 12 of the control valve 2 to the full main pressure, it can be assured that after elapse of a certain time since commencement of the engagement of the shift member 1, the control piston 3 will be restored to its initial position on the right, in which the pressure application line 10 leading to the shift member 1 is connected directly to the pressure medium supply line 13 for unthrottled supply of pressure medium to the shift member.

Figure 2:
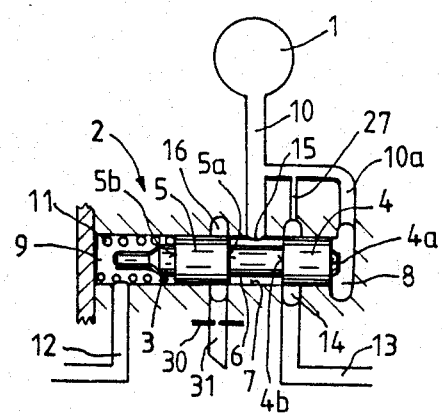
FIG. 2 shows a schematic diagram of a second embodiment of a control means according to the invention.

In the embodiment according to FIG. 2, instead of the comparatively bulky accumulator 18, a simple throttle 30 has been connected to the pressure medium connection 16, communicating by way of an outlet line 31 with the atmosphere. In this way, by simple means, much the same effect is obtained with regard to limiting the engagement pressure for the member 1 as in the embodiment of FIG. 1. For if, after the slack of the shift member 1 has been taken up, the control piston 3 of valve 2 is displaced to the left by the application pressure prevailing in the pressure application chamber 8 for closure of the pressure medium connection 14 by the shoulder 4, the edge 5a of the left shoulder 5 opens the housing connection 16, communicating by way of the throttle 30 with the outlet line 31. In the pressure application line 10, which now communicates by way of throttle 27 with the pressure medium supply line 13 and by way of throttle 30 with the atmosphere, a pressure then establishes itself that lies between these two limits, and can be adjusted in level by suitable dimensioning of the two throttles 27 and 30. This pressure, by the way, continues to be maintained until the control piston 3 of the valve 2 is displaced to the right in the drawing by the aforementioned change of application pressure in the pressure application chamber 9, namely by switching the pressure in the pressure line 12 to the main pressure, so that the pressure application line 10 will again communicate with the pressure medium supply line 13, and the full main pressure thus be attained ahead of the shift member 1.

The essential advantage of this embodiment over the embodiment of FIG. 1 here consists in that, dispensing with any past conventional accumulator, a similar control of the application pressure for the shift member is achieved. Since such system controls are to be provided for several circuit elements, elimination of the accumulators may simplify the entire control, in that it may be exercised with fewer parts and in a smaller space.

Figure 3:
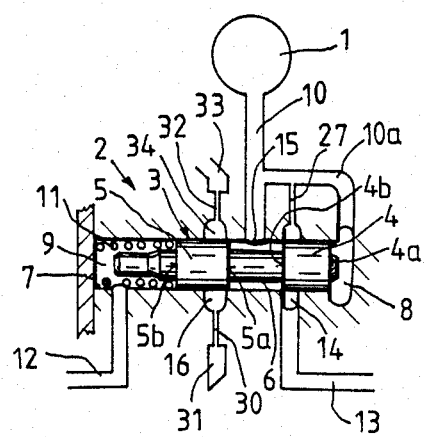
FIG. 3 shows a diagram of a third embodiment of the control means.

In the embodiment according to FIG. 3, lastly, an additional possible configuration of the control means is represented. Here, when the pressure medium connection 14 is closed by the shoulder 4, the edge 5a of shoulder 5 not only opens the throttle 30 communicating with the outlet line 31 but also another throttle 32 communicating with a pressure line 33, and connects it to the pressure application line 10. The pressure line 33, communicating by way of throttle 32 with a pressure medium connection 34 separated from the pressure medium connection 16, can now carry pressures at different levels depending on transmission speed. It is here convenient to connect this pressure line 33 to a pressure application line of another shift member of the transmission, in order to realize different engagement pressures in the application line 10 of shift member 1 for different transmission speeds.

Assuming that the shift member 1 is for example the disk brake B2 interposed in the second and fourth forward speeds of an automatic four-speed transmission, it is convenient to set the application pressure of the shift member at different levels in the two speeds in which the shift member is in, namely according to the respective torque level. Thus it is convenient to fix the engagement pressure of the disk brake B2 higher in second speed and lower in fourth speed, firstly for the sake of comfortable shift operation and secondly for secure transmission of the prevailing torques.

Now if the pressure line 33 is connected to the application line of the forward clutch K1 of the four-speed transmission, which is in the first three forward speeds of the transmission and out in the fourth forward speed, then there will automatically be a variation of the pressure in line 33 according to the transmission speed. Whereas this pressure line 33 then carries main pressure in second speed, here relevant, in fourth speed it carries atmospheric pressure. As a result, when the control piston 3 of valve 2 is switched from its initial position, the pressure application line 10 leading to the shift member 1 is supplied with main pressure both by way of throttle 27 and by way of throttle 32 in second speed, whereas pressure medium escapes into the atmosphere by way of throttle 30. In fourth speed, on the other hand, the pressure application line 10 of shift member 1 is supplied with pressure medium from supply line 13 by way of throttle 27 only, while two parallel throttles 30 and 32 lead to the atmosphere. The consequence is that in second speed a higher engagement pressure is established than in fourth speed, and in fact the engagement pressure in second speed is just as much higher than a mean engagement pressure encountered in an embodiment of the control device without the throttle 32 as the engagement pressure in fourth speed is lower than that intermediate engagement pressure.

Figure 4:
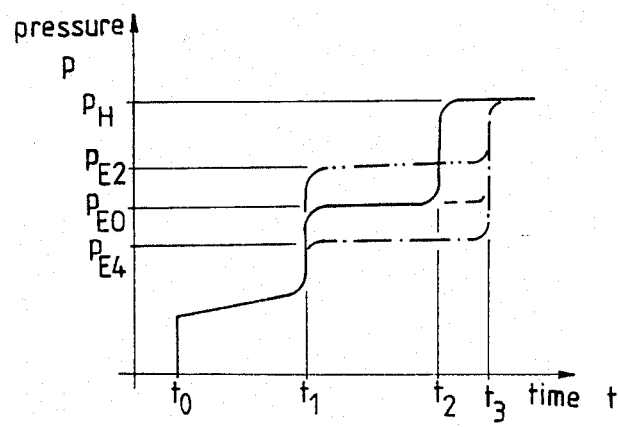
FIG. 4 shows the pressure curve obtainable ahead of the shift member by the control means according to the invention, in a plot of pressure against time.

This situation, namely the behavior of the engagement pressure as a function of time when the shift member 1 is put in, is represented more specifically in the graph of FIG. 4. Here the solid lines represent the pressure in the pressure application line 10 as a function of time, as it would behave in an embodiment according to FIG. 1. $t_0$ indicates the time of commencement of the operation of engagement of member 1, $t_1$ the time of switching the piston 3, and $t_2$ the time of contact of the accumulator piston 19 with its left-hand stop. The application pressure in the line 10 after the slack in the shift member has been taken up attains a more or less constant engagement pressure, indicated by $p_{E0}$ in FIG. 4.

The behavior of the application pressure in the control means as embodied in FIG. 2 is more or less the same. Here the engagement pressure $p_{E0}$ is maintained only for an arbitrary length of time, until at time $t_3$ the piston 3 of control valve 2 is restored to its right-hand initial position (broken line).

Dot-dash lines and double-dot-dash lines show the behavior of the pressure in the pressure application line 10 for the embodiment of FIG. 3, the double-dot-dash line applying to the interposition of member 1 in second speed with its higher engagement pressure $p_{E2}$ and the dot-dash line to the fourth speed with its lower engagement pressure $p_{E4}$.

While the invention has been illustrated and described as embodied in hydraulic control means for controlling the application of a pressure medium to a hydraulically actuable shift member intended for an automatic motor vehicle transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An improved hydraulic control means for controlling application of a pressure medium to a hydraulically actuable shift member intended for an automatic motor vehicle transmission, the control means having a throttle in a pressure application line leading to the shift member and a control valve for controlling an unthrottled connection which bypasses the throttle between a pressure medium supply line and the shift member as a function of an application pressure in the line leading to the shift member in such manner that upon commencement of the application of pressure to the shift member, the connection is opened, and interrupted when a preassigned application pressure is reached, and further having a device for at least temporary maintenance of an engagement pressure which is below the full application pressure and remains at a substantially constant level, wherein the improvement comprises the control valve being configured so as to connect the device for engagement pressure maintenance only upon interruption of the unthrottled connection between the pressure medium supply line and the shift member.

2. An improved control means as defined in claim 1, wherein the control valve comprises an axially adjustable control piston having two control shoulders connected by a shank, one of said control shoulders being provided so as to control communication of a pressure medium connection leading to the shift member with a pressure medium connection communicating with the pressure medium supply line, and the other of said control shoulders being provided so as to control communication with a pressure medium connection leading to the device for engagement pressure maintenance.

3. An improved control means as defined in claim 2, wherein the control piston of the control valve has an active surface which is acted upon by the application pressure in the line leading to the shift member and an opposed active surface which is acted upon by a spring and a controllable pressure head.

4. An improved control means as defined in claim 1, wherein the device for maintaining the engagement pressure comprises an accumulator having a piston adjustable against a counterforce by pressure applied to the shift member.

5. An improved control means as defined in claim 1, wherein the device for maintaining the engagement pressure includes at least one throttle in communication with the atmosphere.

6. An improved hydraulic control means for controlling application of a pressure medium to a hydraulically actuable shift member intended for an automatic motor vehicle transmission, the control means having a throttle in a pressure application line leading to the shift member and a control valve for controlling an unthrottled connection which bypasses the throttle between a pressure medium supply line and the shift member as a function of an application pressure in the line leading to the shift member in such manner that upon commencement of the application of pressure to the shift member, the connection is opened, and interrupted when a preassigned application pressure is reached, and further having a device for at least temporary maintenance of an engagement pressure which is below the full application pressure and remains at a substantially constant level, wherein the improvement comprises the control valve being configured so as to connect the device for engagement pressure maintenance only upon interruption of the unthrottled connection between the pressure medium supply line and the shift member, wherein the device for maintaining the engagement pressure includes at least one throttle in communication with the atmosphere, and wherein the device fir maintaining engagement pressure includes two throttles, one of which communicates with an outlet line leading to the atmosphere and the other throttle communicates with a pressure line subjected to a pressure which is variable according to the transmission.

7. An improved control means as defined in claim 6, wherein the pressure line communicates with a pressure application line associated with a second shift member, wherein application pressure prevails in a first gear train and atmospheric pressure in a second gear train.

8. A hydraulic control mechanism for controlling application of a pressure medium to a hydraulically actuable shift member of an automatic motor vehicle transmission, the mechanism comprising: a pressure medium supply line; a pressure application line provided so as to lead from said pressure medium supply line to the shift member; throttle means provided in said pressure application line; a control valve provided so as to control an unthrottled connection between said pressure medium supply line and the shift member which bypasses said throttle, said control valve controlling said unthrottled connection as a function of application pressure in the line leading to the shift member so that upon commencement of pressure application to the shift member the connection is opened, and when a preassigned application pressure is reached the connection is interrupted; and, engagement pressure maintenance means for at least temporarily maintaining an engagement pressure which is below a full application pressure and at a substantially constant level, said control valve being configured so as to connect said pressure maintenance means only upon interruption of the unthrottled connection.

* * * * *